(12) United States Patent
Gibbon et al.

(10) Patent No.: US 8,566,877 B2
(45) Date of Patent: *Oct. 22, 2013

(54) METHOD AND APPARATUS FOR CONTENT INFORMATION RELATED TO A MEDIA PROGRAM

(75) Inventors: David Gibbon, Lincroft, NJ (US);
Michael Johnston, New York, NY (US);
Behzad Shahraray, Freehold, NJ (US)

(73) Assignee: AT&T Intellectual Propety I, L.P., Atlanta, GA (US)

( * ) Notice: Subject to any disclaimer, the term of this patent is extended or adjusted under 35 U.S.C. 154(b) by 69 days.

This patent is subject to a terminal disclaimer.

(21) Appl. No.: 13/252,563

(22) Filed: Oct. 4, 2011

(65) Prior Publication Data

US 2012/0030709 A1 Feb. 2, 2012

Related U.S. Application Data

(63) Continuation of application No. 11/592,469, filed on Nov. 2, 2006, now Pat. No. 8,056,101.

(51) Int. Cl.
*G06F 3/00* (2006.01)
*H04N 5/445* (2011.01)
*G06F 3/048* (2013.01)

(52) U.S. Cl.
USPC ............... 725/46; 725/45; 715/745; 715/811

(58) Field of Classification Search
USPC ............................. 725/45, 46; 715/745, 811
See application file for complete search history.

(56) References Cited

U.S. PATENT DOCUMENTS

| 6,177,931 | B1 | 1/2001 | Alexander | |
| 6,822,661 | B2 * | 11/2004 | Sai et al. | 715/716 |
| 6,934,964 | B1 | 8/2005 | Schaffer | |
| 6,968,364 | B1 | 11/2005 | Wong | |
| 6,973,665 | B2 | 12/2005 | Dudkiewicz | |
| 7,020,893 | B2 | 3/2006 | Connelly | |
| 7,366,685 | B2 | 4/2008 | Emerick | |
| 2001/0054178 | A1 | 12/2001 | Lee | |
| 2002/0032904 | A1 * | 3/2002 | Lerner | 725/14 |
| 2002/0129368 | A1 | 9/2002 | Schlack | |

(Continued)

FOREIGN PATENT DOCUMENTS

| WO | WO0174063 | 10/2001 |
| WO | WO0176248 | 10/2001 |

(Continued)

OTHER PUBLICATIONS

"International Application Serial No. PCT/US2007/063335, Written Opinion mailed on 11-".

(Continued)

*Primary Examiner* — Hoang-Vu A Nguyen-Ba
(74) *Attorney, Agent, or Firm* — Guntin & Gust, PLC; Ed Guntin

(57) ABSTRACT

In one embodiment, a system generates a customized interface based on displayed programming. The system stores a program that a user displayed through a media device; searches through a network for information related to the displayed program; and extracts data associated with the information related to the displayed program. A custom interface is generated based substantially on the data associated with the information related to the displayed program.

20 Claims, 5 Drawing Sheets

(56) References Cited

U.S. PATENT DOCUMENTS

| | | | |
|---|---|---|---|
| 2002/0162117 A1* | 10/2002 | Pearson et al. | 725/109 |
| 2003/0229900 A1 | 12/2003 | Reisman | |
| 2004/0003413 A1 | 1/2004 | Boston | |
| 2004/0031058 A1 | 2/2004 | Reisman | |
| 2004/0268398 A1 | 12/2004 | Fano | |
| 2005/0076364 A1* | 4/2005 | Dukes et al. | 725/46 |
| 2005/0149964 A1 | 7/2005 | Thomas | |
| 2005/0210524 A1 | 9/2005 | Dolph | |
| 2005/0229220 A1 | 10/2005 | Fisher | |
| 2005/0267994 A1 | 12/2005 | Wong | |
| 2005/0286860 A1 | 12/2005 | Conklin | |
| 2006/0008256 A1 | 1/2006 | Khedouri | |
| 2006/0010470 A1 | 1/2006 | Kurosaki | |
| 2006/0085812 A1 | 4/2006 | Shishegar | |
| 2006/0242574 A1 | 10/2006 | Richardson | |
| 2007/0076728 A1 | 4/2007 | Rieger | |
| 2007/0118396 A1 | 5/2007 | Matz | |
| 2007/0277201 A1 | 11/2007 | Wong | |
| 2008/0052630 A1 | 2/2008 | Rosenbaum | |
| 2008/0098436 A1 | 4/2008 | White | |
| 2009/0070806 A1 | 3/2009 | Flickinger | |

FOREIGN PATENT DOCUMENTS

| | | |
|---|---|---|
| WO | WO2006051492 | 5/2006 |
| WO | WO2006079977 | 8/2006 |
| WO | WO2006105480 | 10/2006 |
| WO | WO2008057941 | 5/2008 |
| WO | WO2008130434 | 10/2008 |

OTHER PUBLICATIONS

"U.S. Appl. No. 11/583,632, Non-Final Office Action mailed Apr. 1, 2009".

"International Application Serial No. PCT/US2007/081489, International Search Report".

International Application Serial No. PCT/US2007/083335, International Search Report.

* cited by examiner

METHOD AND APPARATUS FOR CONTENT INFORMATION RELATED TO A MEDIA PROGRAM

CROSS-REFERENCE TO RELATED APPLICATIONS

This application is a continuation of U.S. patent application Ser. No. 11/592,469 filed Nov. 2, 2006 which is incorporated herein by reference in its entirety.

FIELD OF THE DISCLOSURE

The application relates generally to the field of multimedia processing, and more specifically to a customized interface based on viewed programming.

BACKGROUND OF THE DISCLOSURE

While watching broadcast programming, a segment of particular interest to a user may be presented. For example, the broadcast programming may include a recipe or may refer the user to a website. The user then searches a network, such as the Internet, for that cooking recipe or website. In some instances, when the user accesses the Internet, the cooking recipe or item of interest is not immediately available. The user often, then, searches through the website for the item of interest. Sometimes, the reference to the particular show is not found due to the large amount of information on the website or the inadequate search mechanisms.

In some instances, immediate access to the Internet is not available for the user. The user may then forget the website address given, or may forget the segment altogether in the course of a busy day.

BRIEF DESCRIPTION

An example embodiment of the present invention is illustrated by way of example and not limitation in the figures of the accompanying drawings, in which like references indicate similar elements and in which.

DETAILED DESCRIPTION OF THE DRAWINGS

According to an aspect of the present subject matter, a system is provided to generate a customized interface based on viewed programming. The system stores a program that a user viewed through a media device; searches through a network for information related to the viewed program; and extracts data associated with the information related to the viewed program. A custom interface is generated based substantially on the data associated with the information related to the viewed program.

In the following description, for the purposes of explanation, numerous specific details are set forth in order to provide a thorough understanding of the disclosed embodiments. It will be apparent, however, to one skilled in the art that the disclosed embodiments may be practiced without some of these specific details. In other instances, well-known structures and devices are shown in block diagram form.

Example System Environment

Figure 1:
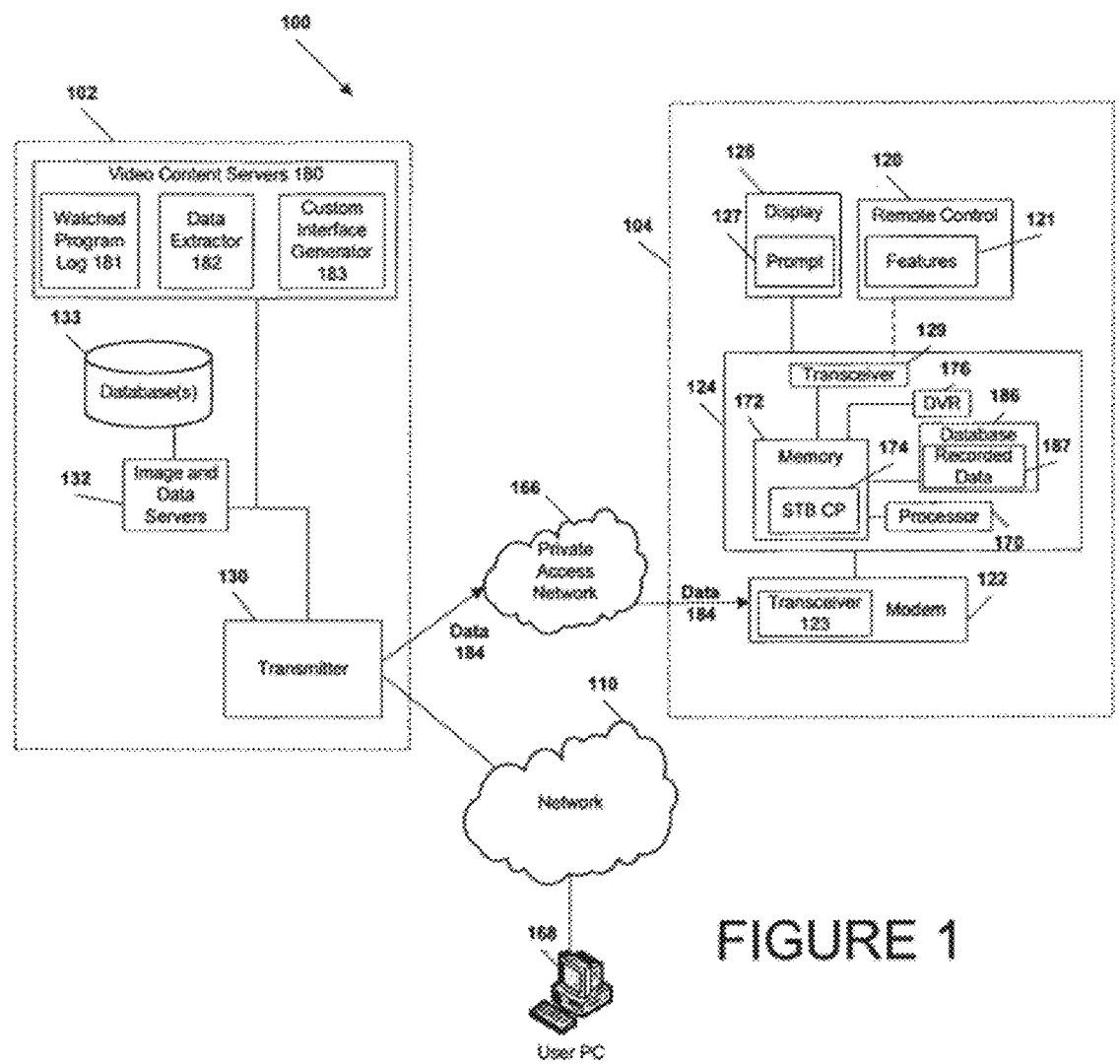
FIG. 1 illustrates a system environment in which one embodiment may be implemented.

Referring to FIG. 1, an illustrative embodiment of a system that may be used to provide video content is illustrated and is generally designated 100. As shown, the system 100 may include a service provider tier 102 and a media device tier 104. Tier 102, 104 is coupled to network 110, such as the Internet; and to a private access network 166 for communication. The private access network 166 may be, for example, a managed video content services access network or may be an Internet Protocol Television (IPTV) access network, as shown in more detail in FIG. 4.

In an illustrative embodiment, modems, such as a modem 122 may be coupled to the private access network 166. The service provider tier 102 may communicate with a representative media device 124 via the modem 122, for instance. The modem 122 may include a transceiver, such as transceiver 123 of modem 122, to receive and send data 184, for instance. The data 184 received may include video content and/or locator code data.

The locator code data may include, for instance, a start time of a program, an end time of a program, a channel or access point of a program, a code associated with the program (e.g., VCR+® code), and any other information that may be useful in recording a program or in determining access to a recorded program.

The transceiver 123 may receive the video content from a video content server 180 (or a service provider) on a first band channel, and may receive locator code data from the service provider on a second band channel that is lower than the first band channel. Embodiments herein may work with different band channel systems that combine higher quality band channels with narrower band channels, such as AT&T's HomeZone® (combining Satellite with DSL) and other embodiments that combine Satellite with WiMax, for example.

The video content may be sent on a high quality band channel, such as from a satellite source, cable source, IPTV source, on-air source, streaming media from the Internet or media downloaded from the Internet, as in a Podcast®, or any other suitable source. The locator code data may be sent via phone, DSL, WiMax, cable source, wireless source, IPTV source, satellite source, on-air source, or any other suitable source. The locator code data and/or the video content may be sent with an electronic program guide (EPG). In the instance of different band channels, the locator code data may be transmitted to the user separately from the video content.

In other embodiments, the video content and the locator code data are sent to the media device tier on the same band channel, either together or separately, as appropriate. The locator code data may be embedded in, and transmitted with, the video (e.g., in one of the lines in the vertical blanking interval for analog TV, or in the MPEG user data for digital TV). In another embodiment, the locator code data may not be sent to the media device. In this instance, the service provider may log the data in the network, rather than logging the data at the media device.

A lower bandwidth bi-directional communications link may send and/or receive data. For example, through the transceiver 123, the media device 124 may transmit information to a video content server 180 about what program the user is or has viewed to use, for example, in a customized interface, as discussed herein. The information concerning viewed programming may be sent through either a lower or higher bandwidth communications link.

Additionally or alternatively to the content servers 180, data 184 may be generated, associated, and provided by an outside database, the device 124, and/or a user of the device 124, in other embodiments not shown.

The service provider tier 102 may communicate with a large number of set-top boxes, such as the representative set-top box 124, over a wide geographic area, such as a regional area, a metropolitan area, a viewing area, a designated market area or any other suitable geographic area, market area, or subscriber or customer group that may be supported by networking the service provider tier 102 to numerous set-top box devices. In an illustrative embodiment, the client-facing tier, or any portion thereof, may be included at a video head-end office.

The media device 124 may include a cable box, a set-top box, a transmitter, a multifunctional device, a digital video recorder, a television, a mobile device (such as a mobile phone), a video cassette recorder, a personal computer, a multifunctional device, an image recorder (e.g., for pictures), an audio recorder (e.g., for satellite radio), or any other media device. The media device may include a user interface for IPTV on a display 126 (such as a television monitor) associated with the media device 124, for instance.

In a particular embodiment, the service provider tier 102 may be coupled to modem 122 via fiber optic cables. Alternatively, the modem 122 may be digital subscriber line (DSL) modems that are coupled to one or more network nodes via twisted pairs, and the service provider tier 102 may be coupled to the network nodes via fiber-optic cables. Each set-top box device 124 may process data received via the private access network 166, via an IPTV software platform, such as Microsoft® TV IPTV Edition, as discussed in more detail with regard to FIG. 4.

The set-top boxes 116, 124 may transmit the data 184 to an external display device, such as the display device 126 for displaying content, such as a broadcast program or event, for instance.

The second set-top box device may communicate with the remote control 120. The device 124 may include a wireless transceiver (e.g., transmitter and/or receiver) 129 to communicate with a wireless transmitter/receiver (not shown) of the remote controls 120.

The remote control 120 may include multiple features or indicators 121 capable of being selected to connect and interact with the device 124. The selections with regard to the segment list may be made using features of one of the remote controls 120, as described in more detail herein. The set-top box devices 124 may communicate commands (i.e., to view a particular broadcast program) received from the remote control devices 120 to the service provider tier 102 via the private access network 166.

Further, the set-top box device 124 may include a STB processor, such as STB processor 170, and a STB memory device, such as STB memory 172, which is accessible to the STB processor 170. In one embodiment, a computer program, such as the STB computer program (STB CP) 174, may be embedded within the STB memory device 172.

The memory 172 of the device 124 may be coupled with a database 186 including recorded data 187, e.g., video content locally recorded from a transmission by a service provider. Each set-top box device 124 may also include a video content storage module, such as a digital video recorder (DVR) 176. The device may include the DVR, as shown in FIG. 1. In another embodiment, the DVR may be a network DVR.

The device 124 further includes logic (e.g., STB CP 174) to process the locator code data, to record selected content, and to monitor content being viewed for a minimum amount of time. The viewed content mayor may not be previously recorded by the DVR 176 of the media device 124.

The service provider tier 102 may also include one or more video content servers 180 that transmit video content requested by viewers via their set top boxes. In an illustrative embodiment, the video content servers 180 may include one or more multicast servers. The video content servers 180 may additionally or alternatively transmit audio content, and/or image content.

A list of programs that a user has viewed through the media device, as determined by the logic 174, may be stored on a watched program log 181 of the video content servers 180. The means for storing a list of programs that a user viewed through the media device includes the watched program log 181. The data may be stored in volatile or non-volatile memory.

A network, such as the Internet, may be searched for information related to each viewed program of the list of programs by a data extractor 182 of the video content servers. The related information may include a recipe, a program discussion group, a program web log, a program transcript, a program rating system, an actor Podcast®, program summary information, video thumbnails, or any other program related information. The network may include the Internet, and/or a home or enterprise network with information related to programming, for example, a Google® local hard drive search.

Further, data associated with the information related to each viewed program may be extracted from the Internet by the data extractor 182. The data may include a web link to any program-related information, the recipe, a link to the recipe, the program discussion group or a link to the discussion group, the program web log or a link to the web log, the program transcript or a link to the transcript, the program rating system or a link to the rating system, a promotional product link (Web advertisements may match those on viewed programs), an actor Podcast® link, program summary information or a link to the information, video thumbnails or a link to the thumbnails (e.g., to watch favorite segments again), or any other program related information or a link thereto.

The data associated with the information related to each viewed program (e.g., web links, recipes, transcripts, and other program specific information) may be extracted automatically by the data extractor 182 and stored on a database 133 of the video content server(s) 180. The data may be stored in volatile or non-volatile memory. In an additional embodiment, the data may be extracted at the media device, wherein the media device includes a data extractor similar to the data extractor 182. The means for searching through the Internet for information related to each viewed program of the list of programs includes the data extractor 182. The means for extracting data associated with the information related to each viewed program includes the data extractor 182. The means for storing the data associated with the information related to each viewed program includes database 133.

Figure 2:
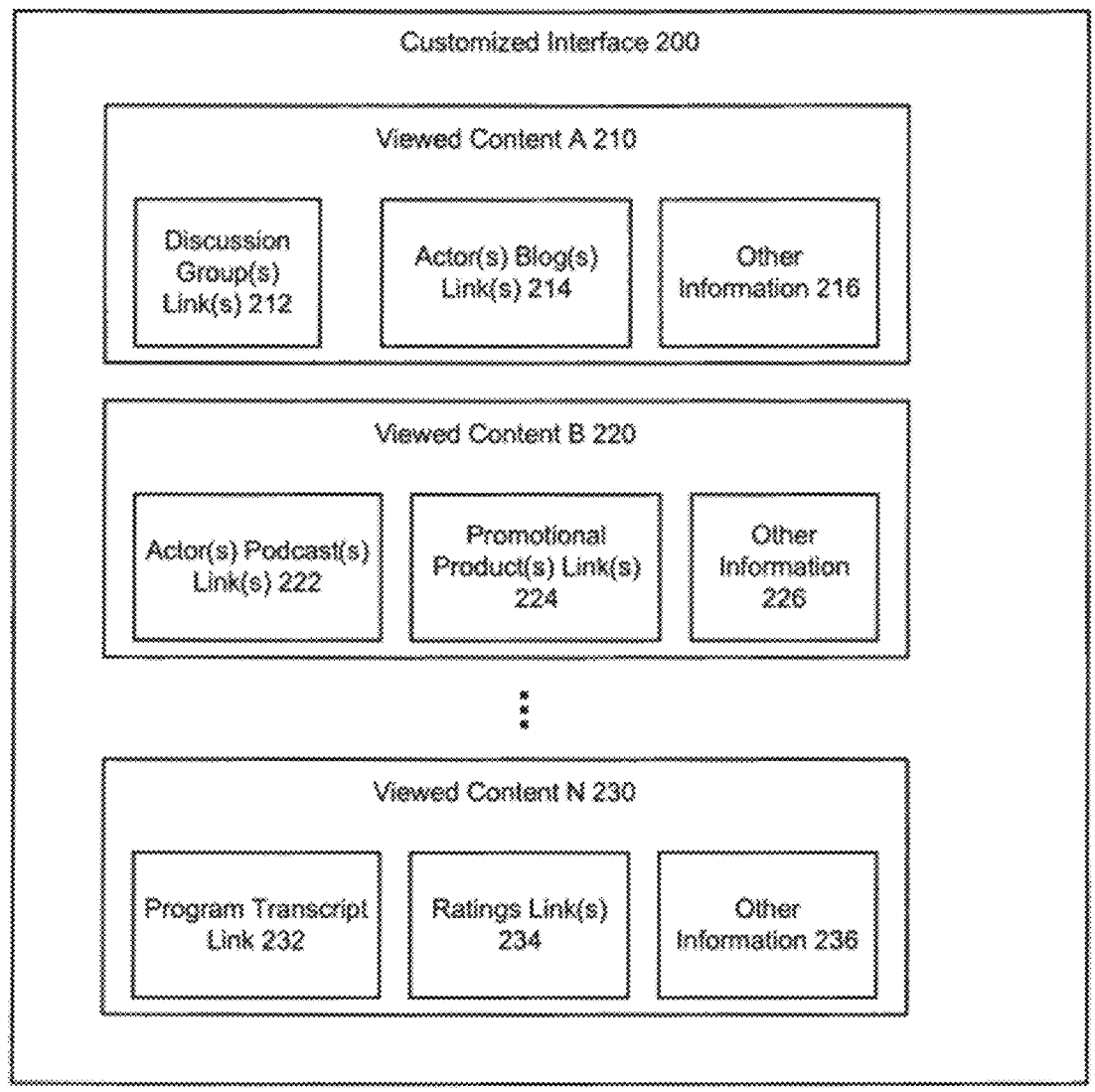
FIG. 2 illustrates a customized interface according to an example embodiment.

A custom interface generator 183 may generate an interface 200, of FIG. 2, customized for the user based substantially on the data associated with the information related to each viewed program. In particular embodiments, the interface 200 may be viewed on the user PC 168 or on a mobile device. In another embodiment, the interface 200 may be customized for viewing through the media device on the display 126, for example within an IPTV viewing system. The custom interface generator 183 may generate a prompt 127 of the display 126, such as a toolbar, a sidebar or a menu page to access the customized information related to previously viewed content. The means for generating a interface customized for the user based substantially on the data associated with the information related to each viewed program includes the custom interface generate 183.

In particular embodiments, the customized interface 200 does not include information for a program that has been recorded by the user but has not been viewed by the user. In an embodiment, only information from viewed programs is on the customized interface 200.

In embodiments, the interface 200 exclusively includes broadcast programs viewed for a minimum pre-determined duration or a minimum dwell duration. For example, the user has viewed each of these programs for at least 10 seconds. In another embodiment, the programs have been viewed for at least two minutes. The user may have the option to choose the minimum duration before the information is published to the interface 200.

In the instance where there are multiple users for a single media device 124, settings may be selected to account for such instances. In this instance, multiple interfaces associated with the media device 124 may be available based on pre-determined settings (e.g., each family member has a separate interface based on designated areas of interest), or based on program subject matter (e.g., children's programs, or daytime talk shows) or based on another method. There may also be a main customized interface for each media device 124, with links to several other customized interfaces.

In an illustrative embodiment, the service provider tier 102 may include a transmitter 130 that manages communication between the service provider tier 102 and the private access network 166 and between the service provider tier 102 and the network 110. The transmitter 130 may send the content and/or locator code data to the media device. The means for transmitting the locator code data to the media device may include the transmitter 130.

As shown, the transmitter 130 is coupled to one or more image and data servers 132 for the database(s) 133. Means for storing data includes the database of at least one of the service provider and the media device. In one embodiment, the database 133 stores the locator code data. The data may be stored in volatile or non-volatile memory. The database(s) 133 may also store broadcast events and related information. In an illustrative embodiment, the image and data servers 132 may be a cluster of servers, each of which may store still images, channel and program-related data, or any combination thereof. Again, the data may be stored in volatile or non-volatile memory.

Example Interface

FIG. 2 illustrates the customized interface 200 according to an example embodiment. The customized interface 200 may show a personalized or customized display of information related to locally viewed content. The interface 200 may be generated by the custom interface generator 183 of FIG. 1. The interface 200 is customized for the user (or users) of the media device based substantially on the data associated with the information related to each viewed program.

The customized interface 200 may include information related to a plurality of user-viewed programs. There may be references to a plurality of viewed content, e.g. Block A 210, Block B 220 through Block N 230. Each block 210, 220, 230 may refer to a viewed program and/or be associated with a viewed program through the associated media device. Block A 210 (or any another prominently featured Block, e.g., a highlighted or distinguished block) may refer to a most recently viewed program, a most frequently viewed program or series, and/or a predetermined program or program type, in particular embodiments.

As shown in FIG. 2, within each block 210, 220, 230 may be up to several references to information related to the associated programs. Data associated with this information may include weblinks, for example, discussion group(s) links 212, actor(s) blog(s) links 214, actor(s) podcast(s) links 222, promotional product(s) link(s) 224, program transcript link(s) 232, ratings link(s) 234, information about showing of future episodes, reruns, past episodes, links to programming events having the same actors, and other types of information related to the viewed program 216, 226, 236 (e.g., a cooking recipe, the program summary, a program blog, or links thereto).

The content for each block is substantially immediately available after the program is viewed or after the program is viewed for a minimum duration, so that the information becomes available in substantial real-time as the program is viewed.

The content may be viewed for a minimum amount of time before related information is added to the custom interface 200. In this instance, there is no addition of information to the page 200 from every channel through which the user "surfs" during, for example, a commercial segment in the main program of interest. A minimum pre-determined duration or a minimum dwell duration may be implemented. For example, the user has viewed a program for at least 10 seconds before a related block is to be added to the interface 200. The user may have the option to choose the minimum duration before the information is published to the interface 200.

The customized interface 200 may be personalized to the user or users based on an attribute selected from a group including age, language, demographics, geographic region, and personal interface preferences. The interface 200 may be part of a personal home page with, for example, access to electronic mail, access to stocks, weather, news, local programming information, local events, calendar, and any other personal home page items.

The program, upon which the block 210 may be based, may be viewed after being recorded on the DVR. The program may be viewed while being recorded on the DVR, or may be viewed while not being recorded on the DVR.

In another embodiment, there may be a recommender system (not shown) within the service provider tier 102. Based on comparison of the user's viewing habits with others, the recommender system may determine related programs and provide links 216, 226, 236 on the interface 200 to content related to those programs.

Flowchart

Figure 3:
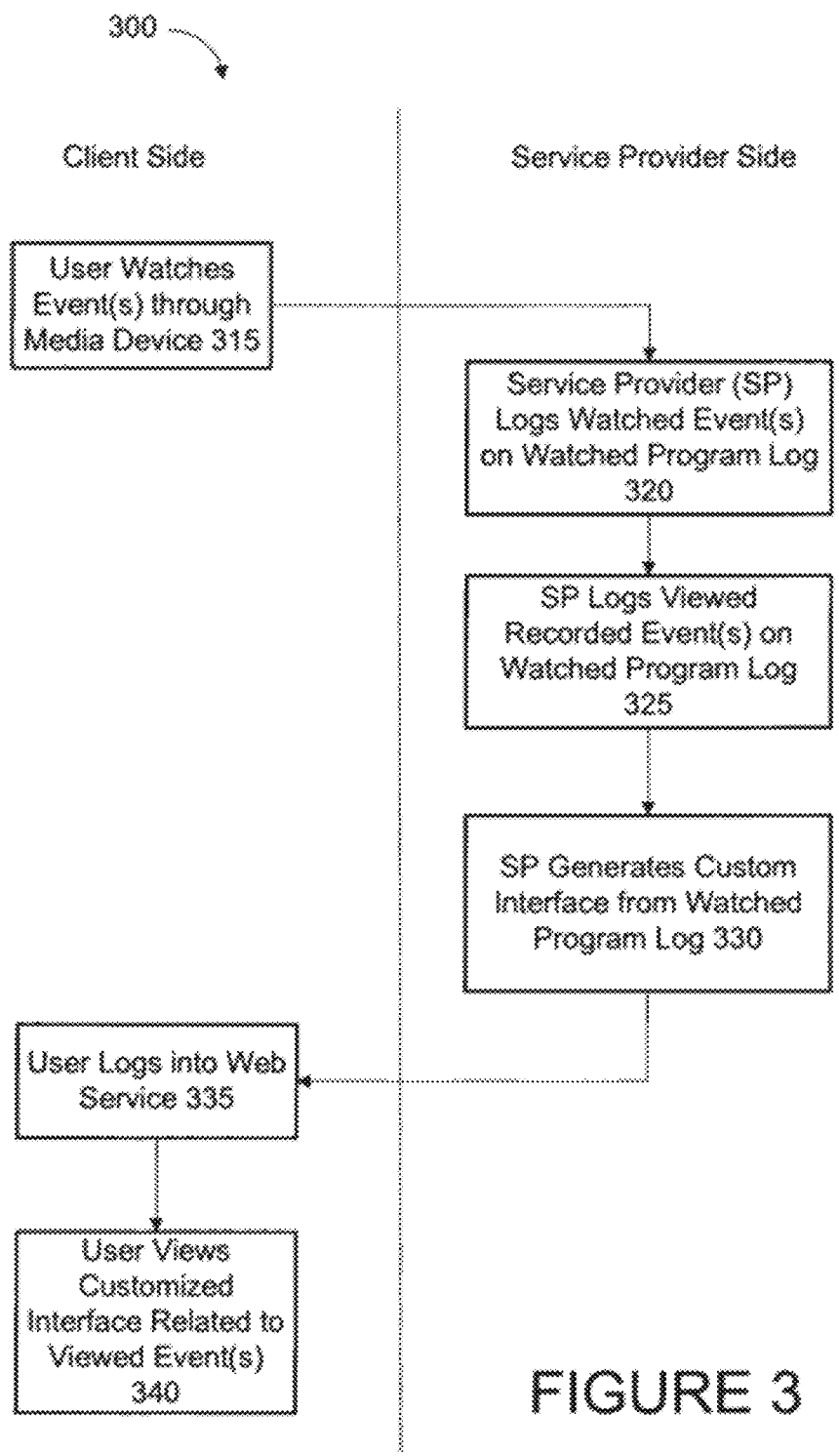
FIG. 3 illustrates an interactive flow chart that demonstrates a method taking place on both the client side and the service provider side, according to an embodiment.

FIG. 3 illustrates an interactive flow chart that demonstrates a method 300 taking place on both the client side and the service provider side, according to an embodiment. The steps described below may be performed under the control of a programmed processor, such as processor 502 and/or processor 170, or the logic may be implemented and distributed among hardware, firmware, software, or a combination thereof within the digital video recorder 176, for example.

At block 315, a user watches one or more events through the media device 124. The processor at the media device may process information when the program is viewed through the media device. The transmitter (e.g., the transceiver 123) may then transmit the viewed program information to be used to extract data from the network.

At block 320, on the service provider side, the service provider logs or stores the watched events of block 315 on the watched program log 181.

At block 325, the service provider logs viewed events on the watched program log 325, wherein the events have been or are being recorded on the digital video recorder 176, for instance.

At block 330, the service provider generates the custom interface 200. The service provider includes the data extractor 182 to search through the Internet for information related to each viewed program of the list of programs on the watched program log 181. The data extractor 182 extracts data associated with the information related to each viewed program, as discussed above. The interface 200 customized for the user is generated based substantially on the data associated with the information related to each viewed program.

At block 335, the user logs into a Web service associated with the custom interface 200. Each user of a media device may have a different login and password, associated with their customized interface 200, as discussed in more detail above.

At block 340, the user views the customized interface 200 related to the viewed event(s). In an example embodiment, information or links may be delivered to a cell phone device, for example, as a multimedia message (MMS). As mentioned herein, the interface 200 may be viewed through a variety of means, including through the media device or through the computer 468.

In particular embodiments, users may more easily find information relevant to viewed programs because the content of the interface may be restricted to specifically viewed content.

The content of the interface may be provided as authored metadata along with the broadcasted programming events. The authored metadata may be provided either by the content producers, by the content deliverer, or by a third party, for instance. In an additional embodiment, interface content may be derived automatically from a search through the Internet or the network. The search may be based upon program title, content, places of things mentioned, or any other appropriate search term. In another embodiment, the interface content may be derived from both the authored metadata and a search.

Example Internet Protocol Television System Environment

Figure 4:
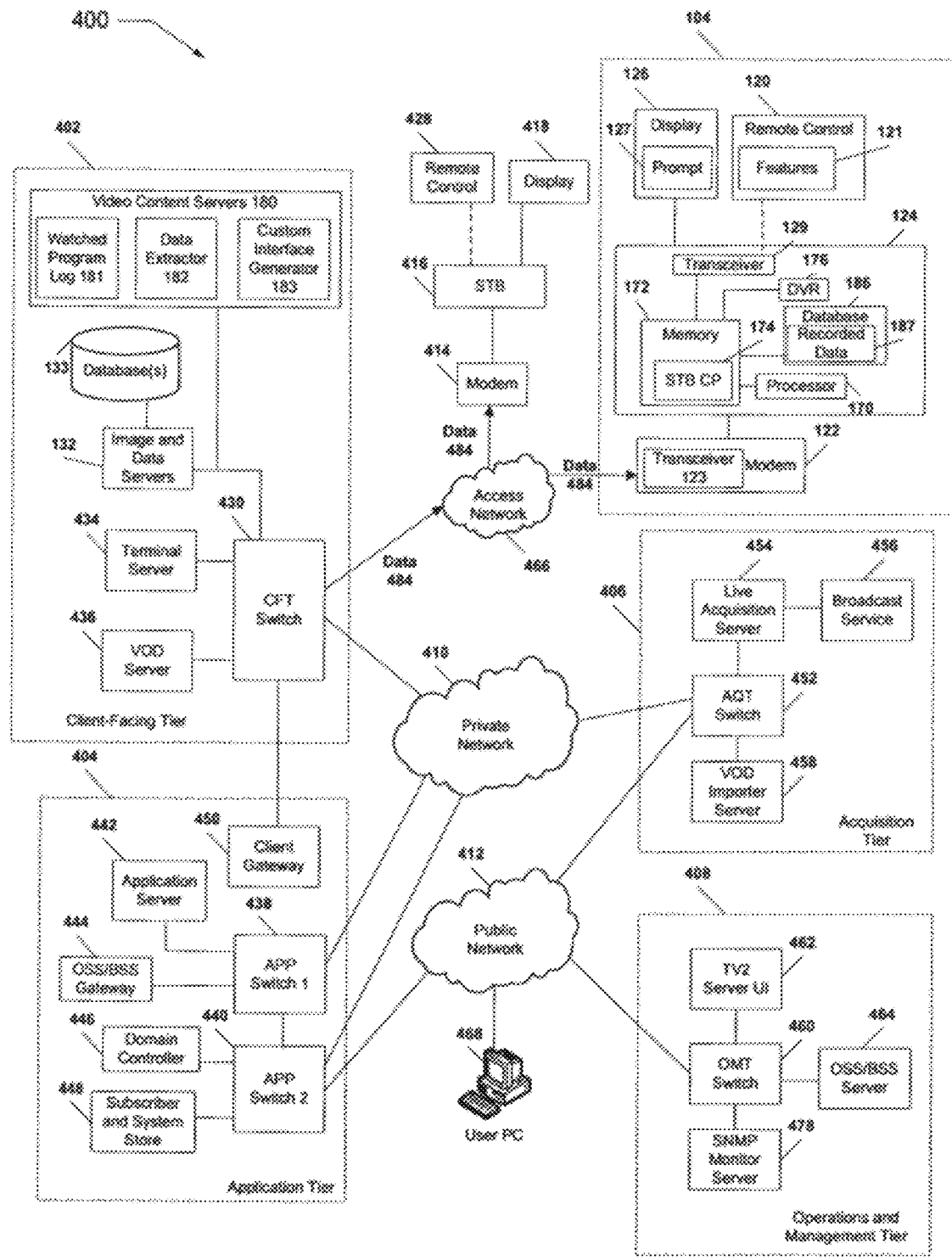
FIG. 4 illustrates an Internet Protocol Television (IPTV) system environment in which an example embodiment may be implemented.

Referring to FIG. 4, an illustrative embodiment of an Internet Protocol Television (IPTV) system that may be used to provide video content is illustrated and is generally designated 400. As shown, the system 400 may include the media device tier 104, a client facing tier 402, an application tier 404, an acquisition tier 406, and an operations and management tier 408. Each tier 402, 404, 406, 408 is coupled to a private network 410; to a public network 412, such as the Internet; or to both the private network 410 and the public network 412. For example, the client-facing tier 402 may be coupled to the private network 410. Further, the application tier 404 may be coupled to the private network 410 and to the public network 412. The acquisition tier 406 may also be coupled to the private network 410 and to the public network 412. Additionally, the operations and management tier 408 may be coupled to the public network 412.

As illustrated in FIG. 4, the various tiers 402, 404, 406, 408 communicate with each other via the private network 410 and the public network 412. For instance, the client-facing tier 402 may communicate with the application tier 404 and the acquisition tier 406 via the private network 410. The application tier 404 may also communicate with the acquisition tier 406 via the private network 410. Further, the application tier 404 may communicate with the acquisition tier 406 and the operations and management tier 408 via the public network 412. Moreover, the acquisition tier 406 may communicate with the operations and management tier 408 via the public network 412. In a particular embodiment, elements of the application tier 404, including, but not limited to, a client gateway 450, may communicate directly with the client-facing tier 402.

As illustrated in FIG. 4, the client-facing tier 402 may communicate with user equipment via a private access network 466, such as an Internet Protocol Television (IPTV) access network. In an illustrative embodiment, modems, such as a first modem 414 and the modem 122 may be coupled to the private access network 466. The client-facing tier 402 may communicate with a first representative media device 416 via the first modem 414. The client-facing tier 402 has similar characteristics to the service provider tier 102 of FIG. 1. Like reference numerals designate similar elements in the drawing figures.

In a particular embodiment, the client-facing tier 402 may be coupled to the modems 414, 122 via fiber optic cables. Alternatively, the modems 414 and 122 may be digital subscriber line (DSL) modems that are coupled to one or more network nodes via twisted pairs, and the client-facing tier 402 may be coupled to the network nodes via fiber-optic cables. Each set-top box device 416, 124 may process data received via the private access network 466, via an IPTV software platform, such as Microsoft® TV IPTV Edition. The media device 124,416 may include a user interface for IPTV on a display 126,418, for instance. The set-top boxes 416, 124 may transmit the data 484 to the external display device 418, 126 for displaying content, such as a broadcast program or event, for instance. The first set-top box device 416 may communicate with a remote control 428.

In an illustrative embodiment, the client-facing tier 402 may include a client-facing tier (CFT) switch 430 that manages communication between the client-facing tier 402 and the private access network 466 and between the client-facing tier 402 and the private network 410. The switch 430 may act as a transmitter to send the content and/or locator code data to the media device. The means for transmitting the locator code data to the media device may include the switch 430.

The CFT switch 430 may also be coupled to a terminal server 434 that provides terminal devices with a connection point to the private network 410. In a particular embodiment, the CFT switch 430 may also be coupled to a video-on-demand (VOD) server 436 that stores or provides VOD content imported by the IPTV system 400.

As illustrated in FIG. 4, the application tier 404 may communicate with both the private network 410 and the public network 412. The application tier 404 may include a first application tier (APP) switch 438 and a second APP switch 440. In a particular embodiment, the first APP switch 438 may be coupled to the second APP switch 440. The first APP switch 438 may be coupled to an application server 442 and to an OSSIBSS gateway 444. In a particular embodiment, the application server 442 may provide applications to the set-top box devices 416, 124 via the private access network 466, which enable the set-top box devices 416, 124 to provide functions, such as display, messaging, processing of IPTV data and VOD material, etc. In a particular embodiment, the OSS/BSS gateway 444 includes operation systems and support (OSS) data, as well as billing systems and support (BSS) data. In one embodiment, the OSS/BSS gateway 444 may provide or restrict access to an OSS/BSS server 464 that stores operations and billing systems data. The BSS may contain or access the watched program log information, for usage billing purposes, for example.

Further, the second APP switch 440 may be coupled to a domain controller 446 that provides web access, for example, to users via the public network 412. For example, the domain controller 446 may provide remote web access to IPTV account information via the public network 412, which users may access using their personal computers 468. The second APP switch 440 may be coupled to a subscriber and system store 448 that includes account information, such as account information that is associated with users who access the system 400 via the private network 410 or the public network 412. In a particular embodiment, the application tier 404 may also include a client gateway 450 that communicates data directly with the client-facing tier 402. In this embodiment, the client gateway 450 may be coupled directly to the CFT switch 430. The client gateway 450 may provide user access to the private network 410 and the tiers coupled thereto.

In a particular embodiment, the set-top box devices 416, 124 may access the IPTV system 400 via the private access network 466, using information received from the client gateway 450. In this embodiment, the private access network 466 may provide security for the private network 410. User devices may access the client gateway 450 via the private access network 466, and the client gateway 450 may allow such devices to access the private network 410 once the devices are authenticated or verified. Similarly, the client gateway 450 may prevent unauthorized devices, such as hacker computers or stolen set-top box devices from accessing the private network 410, by denying access to these devices beyond the private access network 466.

For example, when the first representative set-top box device 416 accesses the system 400 via the private access network 466, the client gateway 450 may verify subscriber information by communicating with the subscriber and system store 448 via the private network 410, the first APP switch 438, and the second APP switch 440. Further, the client gateway 450 may verify billing information and status by communicating with the OSS/BSS gateway 444 via the private network 410 and the first APP switch 438. In one embodiment, the OSS/BSS gateway 444 may transmit a query across the first APP switch 438, to the second APP switch 440, and the second APP switch 440 may communicate the query across the public network 412 to the OSS/BSS server 464. After the client gateway 450 confirms subscriber and/or billing information, the client gateway 450 may allow the set-top box device 416 access to IPTV content and VOD content. If the client gateway 450 cannot verify subscriber information for the set-top box device 416, e.g., because it is connected to an unauthorized twisted pair, the client gateway 450 may block transmissions to and from the set-top box device 416 beyond the private access network 466.

As indicated in FIG. 4, the acquisition tier 406 includes an acquisition tier (AQT) switch 452 that communicates with the private network 410. The AQT switch 452 may also communicate with the operations and management tier 408 via the public network 412. In a particular embodiment, the AQT switch 452 may be coupled to a live acquisition server 454 that receives television or movie content, for example, from a broadcast service 456. In a particular embodiment during operation of the IPTV system, the live acquisition server 454 may acquire television or movie content. The live acquisition server 454 may transmit the television or movie content to the AQT switch 452, and the AQT switch 452 may transmit the television or movie content to the CFT switch 430 via the private network 410.

Further, the television or movie content may be transmitted to the video content servers 480, where it may be encoded, formatted, stored, or otherwise manipulated and prepared for communication to the set-top box devices 416, 124. The CFT switch 430 may communicate the television or movie content (and the locator code data) to the modems 414, 122 via the private access network 466. The set-top box devices 416, 124 may receive the television or movie content via the modems 414, 122, and may transmit the television or movie content to the display devices 418, 126. In an illustrative embodiment, video or audio portions of the television or movie content may be streamed to the set-top box devices 416, 124.

In an example, non-limiting embodiment, each set-top box device 416, 124 may receive content data 484, which may include video content and/or audio content or portions thereof, from the client-facing tier 402 via the private access network 466. The content data 484 may be associated with at least one program, such as a broadcast program itself. Multiple programs may be broadcast through the content data 484 at any given time, each with their own program content data.

Further, the AQT switch may be coupled to a video-on-demand importer server 458 that stores television or movie content received at the acquisition tier 406 and communicates the stored content to the VOD server 436 at the client-facing tier 402 via the private network 410. Additionally, at the acquisition tier 406, the video-on-demand (VOD) importer server 458 may receive content from one or more VOD sources outside the IPTV system 400, such as movie studios and programmers of non-live content. The VOD importer server 458 may transmit the VOD content to the AQT switch 452, and the AQT switch 452, in turn, may communicate the material to the eFT switch 430 via the private network 410. The VOD content may be stored at one or more servers, such as the VOD server 436.

When users issue requests for VOD content via the set-top box devices 416, 124, the requests may be transmitted over the private access network 466 to the VOD server 436, via the CFT switch 430. Upon receiving such requests, the VOD server 436 may retrieve the requested VOD content and transmit the content to the set-top box devices 416,124 across the private access network 466, via the CFT switch 430. The set top box devices 416, 124 may transmit the VOD content to the display devices 418, 126. In an illustrative embodiment, video or audio portions of VOD content maybe streamed to the set-top box devices 416, 124.

FIG. 4 further illustrates that the operations and management tier 408 may include an operations and management tier (OMT) switch 460 that conducts communication between the operations and management tier 408 and the public network 412. In the embodiment illustrated by FIG. 4, the OMT switch 460 is coupled to a TV2 server 462. Additionally, the OMT switch 460 may be coupled to an OSSIBSS server 464 and to a simple network management protocol (SNMP) monitor server 478 that monitors network devices within or coupled to the IPTV system 400. In a particular embodiment, the OMT switch 460 may communicate with the AQT switch 452 via the public network 412. In an illustrative embodiment, the live acquisition server 454 may transmit the television or movie content to the AQT switch 452, and the AQT switch 452, in turn, may transmit the television or movie content to the OMT switch 460 via the public network 412. In this embodiment, the OMT switch 460 may transmit the television or movie content to the TV2 server 462 for display to users accessing the user interface at the TV2 server 462. For example, a user may access the TV2 server 462 using the personal computer (PC) 468 coupled to the public network 412.

Computer Architecture

Figure 5:
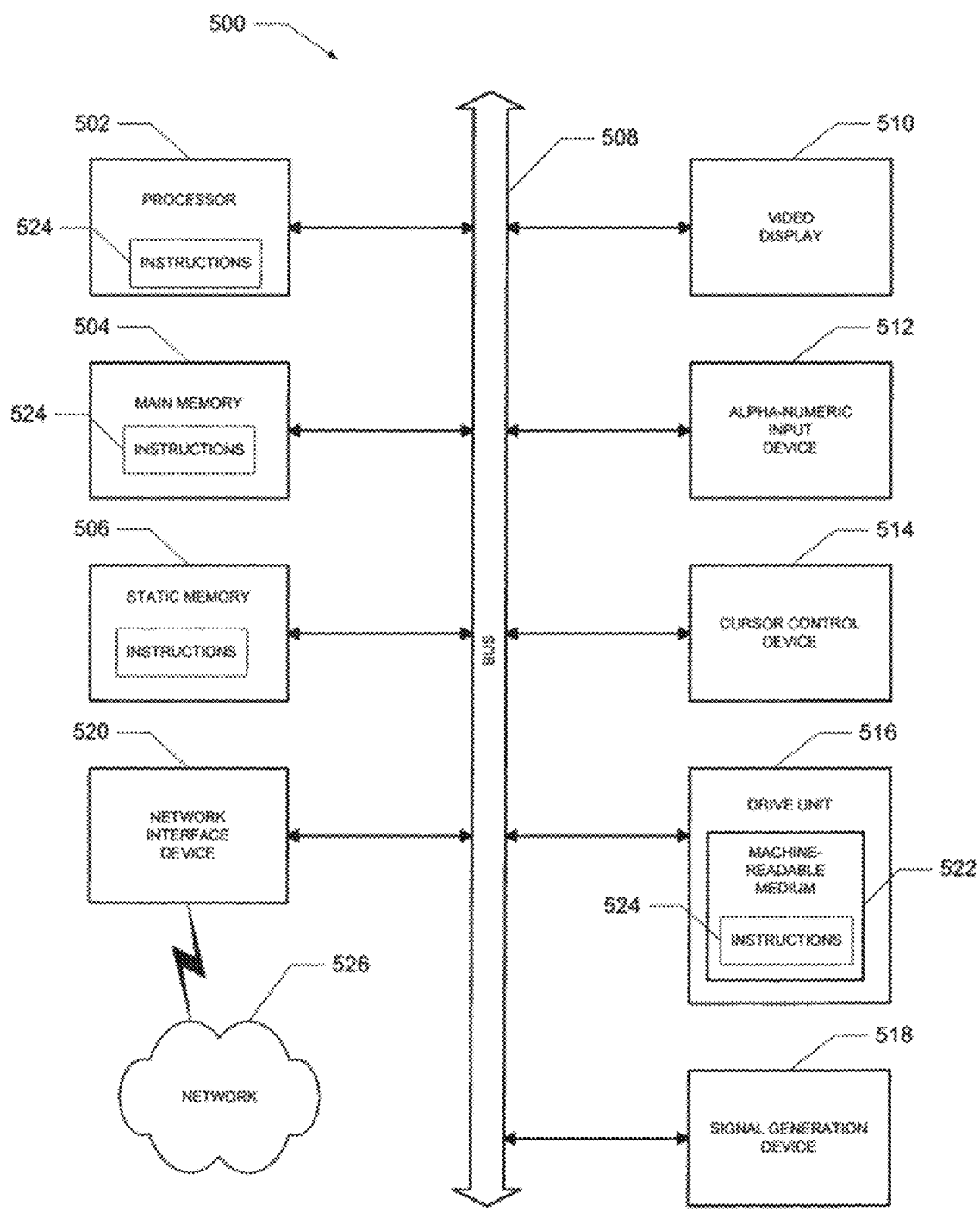
FIG. 5 shows a diagrammatic representation of machine in the example form of a computer system within which a set of instructions, for causing the machine to perform anyone or more of the methodologies discussed herein, may be executed.

FIG. 5 shows a diagrammatic representation of a machine in the example form of a computer system 500 within which a set of instructions, for causing the machine to perform anyone or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a digital video recorder (DVR), a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform anyone or more of the methodologies discussed herein.

The example computer system 500 includes a processor 502 (e.g., a central processing unit (CPU), a graphics processing unit (GPU) or both), a main memory 504 and a static memory 506, which communicate with each other via a bus 508. The main memory 504 and/or the static memory 506 may be used to store the recorded programs, and other data or information discussed herein. In an additional embodiment, the data may be stored in volatile memory.

The computer system 500 may further include a video display unit 510 (e.g., a television, a liquid crystal display (LCD) or a cathode ray tube (CRT) on which to display broadcast or other programs, for example. The computer system 500 also includes an alphanumeric input device 512 (e.g., a keyboard or a remote control), a user interface (UI) navigation device 514 (e.g., a remote control, or a mouse), a disk drive unit 516, a signal generation device 518 (e.g., a speaker) and a network interface device 520.

The input device 512 and/or the navigation device 514 (e.g., the remote control) may include a processor (not shown), and a memory (not shown).

The disk drive unit 516 includes a machine-readable medium 522 on which is stored one or more sets of instructions and data structures (e.g., software 524) embodying or utilized by anyone or more of the methodologies or functions described herein. The software 524 may also reside, completely or at least partially, within the main memory 504 and/or within the processor 502 during execution thereof by the computer system 500, the main memory 504 and the processor 502 also constituting machine-readable media.

The software 524 and/or the data stream 184, 484 from the content provider may further be transmitted or received over a network 526 (e.g., a television cable provider) via the network interface device 520 utilizing anyone of a number of well-known transfer protocols (e.g., broadcast transmissions, HTTP).

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform anyone or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Therefore, methods and systems to customize an interface based on viewed programming have been described. Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A system comprising:
a watched program log to store a plurality of locally displayed programs presented by a media device, wherein each of the plurality of locally displayed programs is provided by a video content server;
a data extractor to provide a search query to a network of servers for content information related to each of the plurality of locally displayed programs, and to extract data associated with the content information related to each of the plurality of locally displayed programs;
a database to store the data associated with the content information related to each of the plurality of locally displayed programs, wherein the data associated with the content information is stored in the database responsive to each of the plurality of locally displayed programs being displayed for at least a predetermined duration; and
a custom interface generator, wherein an interface generated by the custom interface generator is accessible over a distributed data network, wherein the interface is customized according to the data associated with the content information related to each of the plurality of locally displayed programs, and wherein the interface is configured to display information identifying a locally displayed program from the watched program log and the data associated with the content information related to the locally displayed program that has been displayed for at least the predetermined duration.

2. The system of claim 1, wherein the interface is configured for display by the media device as a prompt feature to access the content information related to the locally displayed program, wherein the prompt feature is one of a toolbar, a sidebar or a menu page.

3. The system of claim 1, wherein the data is associated with at least one of a discussion group, a web log, a transcript, a program rating system, a promotional product link, an actor non-streamed webcast link, or other episodes of the locally displayed program.

4. The system of claim 1, wherein the interface does not include information for a recorded program when the recorded program has not been played.

5. The system of claim 1, wherein the interface is accessible for display by a mobile device.

6. The system of claim 1, wherein the network of servers is independent of the video content server.

7. A method comprising:
searching a network of servers for content information related to a media program presented at a media device;
extracting data associated with the content information related to the presented media program;
storing the data associated with the content information related to the presented media program; and generating an interface based on the data associated with the content information related to the presented media program that has been displayed for at least a threshold duration.

8. The method of claim 7, comprising configuring the interface for display by the media device as a prompt feature to access the content information related to the presented media program, wherein the prompt feature is one of a toolbar, a sidebar or a menu page.

9. The method of claim 7, wherein the media device is a mobile device and wherein the method comprises configuring the interface for display by the mobile device.

10. The method of claim 7, wherein the network of servers is independent of a video content server that provides the media program to the media device.

11. The method of claim 7, wherein the interface excludes information for a recorded program of the media program when the recorded program has not been played at the media device.

12. The method of claim 7, wherein the data is associated with at least one of a discussion group, a web log, a transcript, a program rating system, a promotional product link, an actor non-streamed webcast link, or other episodes of the media program.

13. A system comprising:
 a video content server to process displayed program information when a program is displayed at a media device; and
 a transmitter to transmit the displayed program information to a data extraction server for obtaining data from a network of servers, the data being related to the program displayed, the data being used to generate a customized interface based on at least a portion of the displayed program information that is related to locally displayed content having been displayed for a predetermined duration at the media device.

14. The system of claim 13, wherein the program is displayed for a threshold duration before the transmitter transmits the displayed program information.

15. The system of claim 13, further comprising a database to store the program.

16. The system of claim 13, wherein the network of servers is independent of the video content server.

17. The system of claim 13, wherein the data is associated with at least one of a web link to the information related to locally displayed content, a discussion group, or a web log.

18. The system of claim 13, wherein the data is associated with at least one of a transcript, a program rating system, a promotional product link, an actor non-streamed webcast link, information of a related program, other episodes of the displayed program, or a program summary.

19. The system of claim 13, wherein the customized interface comprises a displayed content section that describes locally displayed content presented at the media device.

20. The system of claim 13, wherein the customized interface comprises a plurality of displayed content sections arranged to display first information for a first program more prominently than second information for a second program.

* * * * *